Sept. 30, 1952 M. M. PILTZ 2,612,385
STEERING CONNECTION FOR VEHICLE PUSHED IMPLEMENTS
Filed Sept. 14, 1951 2 SHEETS—SHEET 1
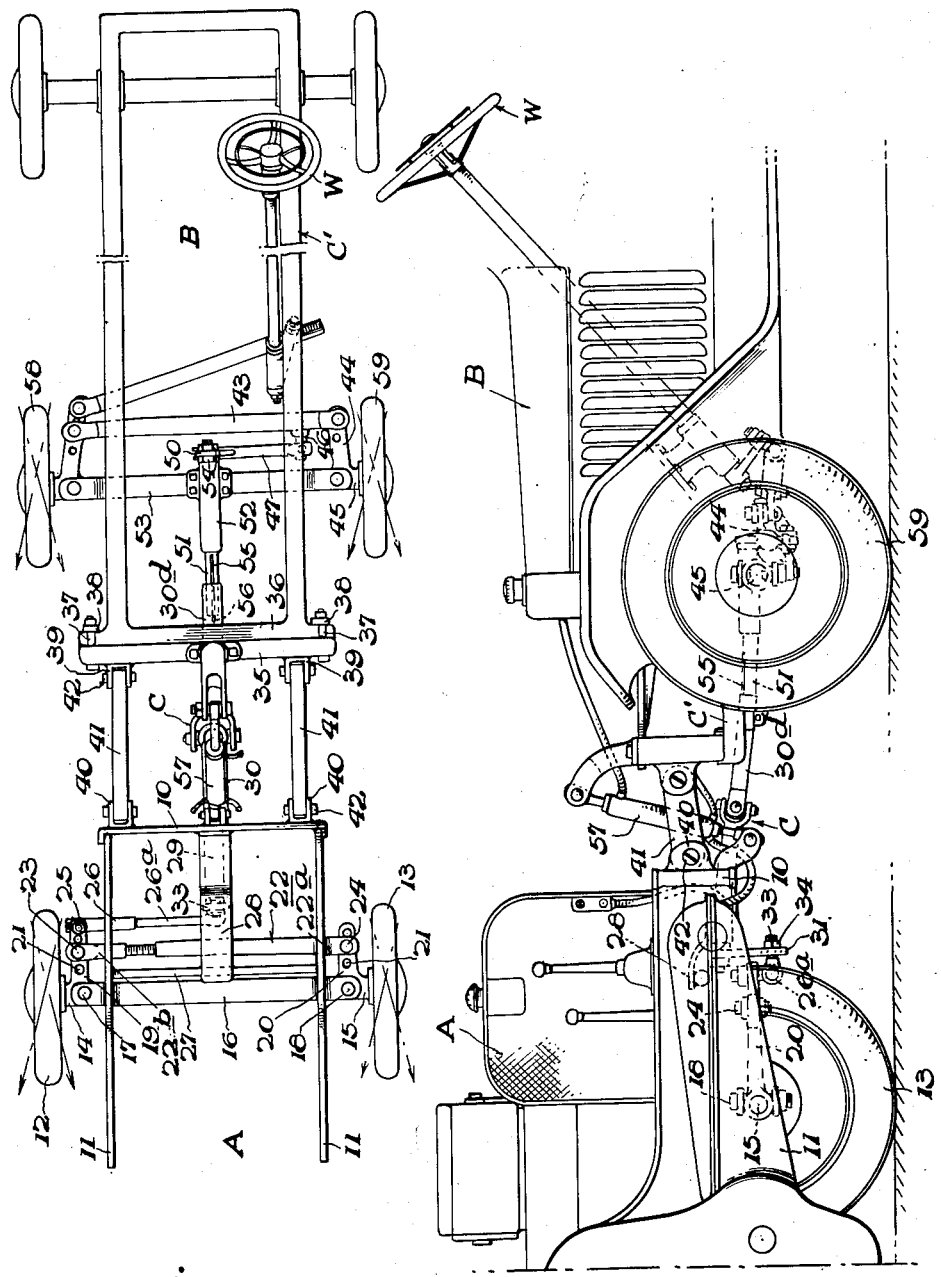
INVENTOR
Michael M. Piltz.
BY Vernon A. Dorsey
ATTORNEY

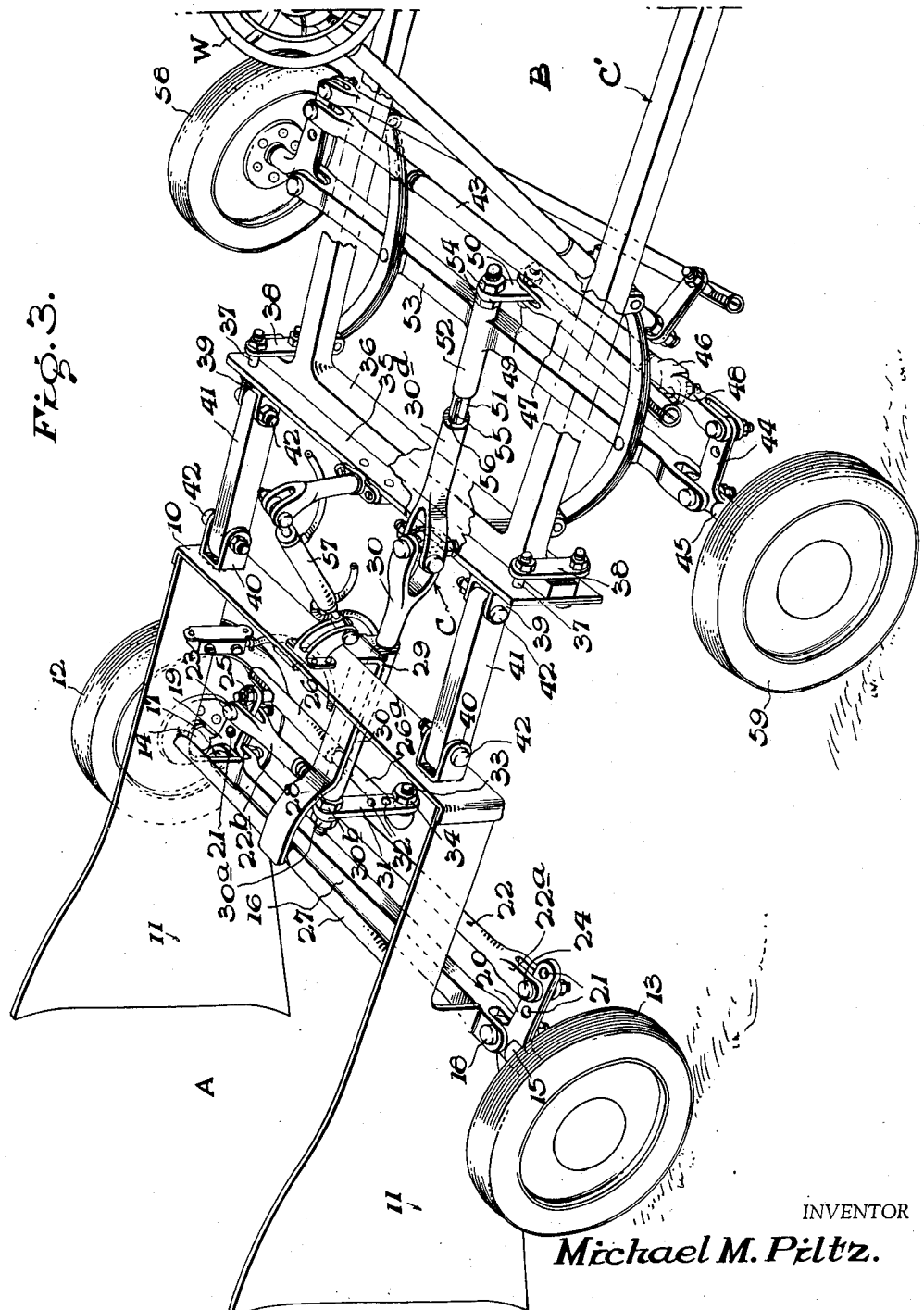

Patented Sept. 30, 1952

2,612,385

UNITED STATES PATENT OFFICE 2,612,385

STEERING CONNECTION FOR VEHICLE PUSHED IMPLEMENTS

Michael M. Piltz, Halifax, Pa.

Application September 14, 1951, Serial No. 246,540

3 Claims. (Cl. 280—33.55)

The present invention relates to coupling means for truck or tractor pushed implements and more particularly to a coupling arrangement of this type for pushing a two wheeled implement, for instance, a snow plow, as shown in the drawings of this case.

Vehicle pushed implements such as snow plows and other devices develop great resistance to steering and sharp turning and raising or tilting movements during operation, with the result that the coupling parts and steering mechanism sometimes shear off. Also, due to lateral strains developed there is a much greater resistance to the forward driving power of the pusher truck or tractor than when the implement is arranged to turn easily with the steering apparatus and to be easily tilted to and from working and non-working position.

The principal object of the present invention is to provide a steering arrangement and connection means used in combination with a pusher type coupling system between a truck or tractor and a two wheeled supported snow plow whereby the plow, as it is pushed forward, is reasonably free to turn and sharply respond to the turning action of the front steering apparatus of the truck or tractor, which is the propelling vehicle.

Another object of the invention is to provide stub axles on each of the snow plow and truck front axles adapted to turn in cooperation with each other so that the snow plow or pushed vehicle is responsive to the steering of the pushing or propelling vehicle.

Another object of the invention is to provide a sturdy and rugged steering mechanism and a pushing connection between the pushing and propelling vehicles so that the same can be easily connected and disconnected and the pushing or propelling vehicle can be used for another purpose.

These and other advantages of the invention will be better understood from the following detailed description when read in connection with the accompanying drawings.

In the drawings:

Fig. 1 is a side elevation of the coupling and steering assembly between a two wheeled snow plow and a truck or tractor, only a forward section of the tractor or truck being shown in the drawings;

Fig. 2 is a top plan view of the coupling and steering assembly between a two wheeled snow plow and a truck or tractor, showing only the chassis of the same;

Fig. 3 is a perspective view of the pushing and steering mechanism of my invention, the front portion of the pushing vehicle only being shown.

Referring to the drawings in detail, there is shown broadly a working implement A, such as a two wheeled snow plow, and a truck or tractor B adapted to be coupled to the rear of the implement A, whereby the snow plow can be propelled or pushed forward by the truck or tractor, and the snow plow can be steered by a steering mechanism connected to and operated by the steering of the front wheels of the tractor.

The coupling means between the pushed implement A and the truck or tractor B is of novel construction and comprises a beam 10 extending across the rear of the implement A. This beam forms part of the chassis 11 of the implement A. The chassis 11 of the implement A is supported by ground engaging wheels 12 and 13. The wheels 12 and 13 are mounted on pivoted steering spindles 14 and 15 of an axle 16, see Figs. 2 and 3. These spindles are like bell crank levers pivotally connected to each end of the axle 16 by pins or bolts 17 and 18 and their other ends are formed with arms 19 and 20. These arms 19 and 20 each have a series of openings or holes 21 therein, the purpose of these holes being fully described in detail later. Extending between and connecting the free ends of the arms 19 and 20 is an equalizing tie rod 22, the tie rod 22 being connected to the arms 19 and 20 by bolts 23 and 24. The tie rod 22 comprises a relatively long section 22ᵃ connected to the arm 20, said tie rod section being interiorly threaded to receive the other section of the tie rod 22ᵇ which is connected at its outer end to the arm 19, the inner end of this tie rod section 22ᵇ having exterior threads on its inner end to engage the internal threads of the threads on the tie rod section 22ᵃ. At this point it is proper to add that by adjusting the over-all length of the tie rod sections 22ᵃ and 22ᵇ and their end positions in the openings 21, the toe-in of the wheels 12 and 13 supporting the snow plow A can be adjusted and varied. Attached to the end of the arm 19 by a bolt 25 to form a loose connection therewith is a steering arm 26 having a section 26ᵃ, the section 26ᵃ being exteriorly threaded, the threads of which engage the threads on the inner end of the arm 26. By this threaded engagement the over-all length of the steering arm can be adjusted.

Connecting the two sides of the chassis 11 of the snow plow above the axle 16 is a brace member 27. The top of the brace member 27 is about the level of the bottom of the beam 10 forming the back section of the chassis of the snow implement. See Fig. 3. Attached to the beam 10 and the brace 27, as by welding, is the support 28 for the steering mechanism of the implement A to be described in detail. Secured to the support 28 on its lower side is an elongated bearing 29 in which is revolvably mounted the section 30 of the universal coupling C. The section 30 of the universal coupling rod is free to turn in said bearing, the position of the section 30 of the universal coupling being controlled by the connection from the steered wheels of the propelled vehicle. On the outer end of the section 30 of the universal coupling C are means for attaching a short arm 31 thereto in a secure manner, the same comprising, as shown in the drawings, two nuts 30ª and 30ᵇ threadedly engaging the section 30 of the universal coupling rod and holding one end of the arm 31 therebetween. The other and lower end of the arm 31 has a series of openings 32 therein to receive the L-shaped end 33 of the section 26ª of the steering arm. The end 33 of section 26ª of the steering arm has threads thereon to receive the nut 34 and hold the end of the steering arm within a given opening 32 in the short arm 31.

The above arrangement allows for increasing or decreasing the throw and therefore the control of the steering mechanism of the propelled vehicle A. This adjustment is of great value in adjusting the throw and therefore the manner in which the wheels of the propelled implement turn in response to the control of the pushing tractor or truck.

So far the description of the invention has related to the steering mechanism governing and controlling the propelled vehicle.

The pushing connection between the pushed vehicle implement A and the pushing vehicle B comprises a plate 35 attached to the bumper 36 on the front of the chassis C¹ of vehicle B. This plate 35 is attached in the manner shown in Figs. 2 and 3, namely by bolts 37 which hold the plate 35 to the bumper 36 by means of a clamping plate 38. On the front of the plate 35 are welded two lugs 39. On the rear of the beam 10 forming part of the chassis 11 of the pushed vehicle A are two complementary lugs 40. Interposed between the lugs 39 and 40 are two pushing bars 41. These pushing bars 41 are pivotally connected to the lugs 39 and 40 by bolts 42.

The above described pushing connection between the two vehicles provides a pushing connection which adjusts itself to the contour of the land traversed by the vehicles and also provides an easy means of connecting and disconnecting the pushed vehicle from the pushing vehicle so that the pushing vehicle can be used for another purpose when it is not desired to use the pushed vehicle for removing snow and dirt. In other words, by this pushing connection the pushing vehicle, if a truck, can be used for the purpose for which it was designed.

The steering apparatus on the pushing vehicle B is of conventional type and therefore will not be described other than the attachment to the conventional steering apparatus which provides means for controlling the position of the two wheels of the vehicle A being pushed. The conventional tie rod 43 on the pushing vehicle B has attached thereto near the arm 44 of the bell crank lever 45 a connection 46 for a lever 47, said connection 46 being in the form of a bracket welded to the front of the tie rod 43, the same having an opening therein to receive the bolt 48 which is attached to one end of the lever 47. The other end of the lever 47 is forked. Within the above fork loosely held therein by the bolt 49 is a short lever 50, said lever having its other end attached to the rod 51. The rod 51 is carried by and supported in a cylindrical bearing 52, the same being attached to the axle 53 of the pushing or propelling vehicle B. Means for securing the short lever 50 to the rod 51 comprises two nuts 54 which embrace the short lever 50. The rod 51 has a key 55 on its forward end to engage the spline 56 in the section 30ᵈ of the universal coupling C. The spline 56 and the key 55 form a positive driving connection between the rod 51 and the section 30ᵈ of the universal coupling C. This connection forms a rugged connection between the steering mechanisms of the two vehicles and also allows the ready disengagement of the steering mechanism so that the pushing vehicle can be used for its intended purpose. The universal steering coupling comprises the sections 30 and 30ᵈ which are connected by a conventional universal joint which will not be described in detail. This universal joint affords a steering connection that will allow the two vehicles to adjust themselves to the contour of the land and especially roads and ditches in which a snow plow, the propelled vehicle, must operate.

Means comprising a hydraulic cylinder 57 are shown for elevating or lowering the front of the snow plow from a control on the propelling or pushing truck or vehicle B, but as this feature forms no part of the present application the same will not be described in detail except to say that the support for the hydraulic cylinder is on the beam 10 forming the back of the chassis 11 of the propelled vehicle A and on a bracket attached to the plate 35 which is attached to the bumper 36 of the pushing vehicle B. The purpose of the description of the mounting of the hydraulic cylinder is only to show that when the pushed snow plow A is removed from the vehicle B, the hydraulic cylinder and its supports will be attached to and carried by the pushed vehicle A thus freeing the front of the pushing vehicle B of this mechanism.

To connect the pushing vehicle B to the snow plow A it is only necessary to position the two vehicles so that the pushing vehicle B is directly behind the pushed vehicle A and thereafter lift up the section 30ᵈ of the universal steering coupling C and telescope the same over the rod 51 having the key 55 thereon engaged in the spline 56 in the section 30ᵈ of the universal coupling C. Thereafter the two vehicles are moved closer together and the clamping plate 38 is secured to the front bumper 36 of the vehicle B by the bolts 37.

The above entitled steering and pushing connection provides a rugged construction that permits of quick and easy connection or disconnection between the two vehicles and also a steering and pushing mechanism having a number of adjustments by which all types of pushed vehicles can be readily controlled regardless of the contour of the land and the resistance offered to the pushing vehicle.

The universal coupling C and the spline and key connection between the steering rod 51 and the section 30ᵈ of the universal coupling C allows the steering mechanism between the two vehicles to adjust itself regardless of the respective elevations of the front wheels 58 and 59 of the pushing vehicle B and the wheels 12 and 13 of the pushed vehicle A.

To disconnect the two vehicles and their respective steering apparatus, it is only necessary to remove the bolts 37 which clamp the plates 35 and 38 to the bumper 36 of the pushing vehicle and thereafter separate the distance between the two vehicles so that the rod 51 is disconnected from the section 30$^d$ of the universal coupling C.

The pushing vehicle is then free to be used and has thereon only the short section of the rod 51 and the rod bearing 52 supported on the axle 53 of the pushing vehicle. None of this auxiliary pushing and steering mechanism projects beyond the front bumper 36 of the pushing vehicle when the two vehicles are disconnected.

In the drawings the bearing 52 for the auxiliary steering mechanism on the vehicle B is shown as being mounted in the middle of the axle 53. This construction is preferred when the pushing vehicle B is of the rear wheel drive type but when the pushing vehicle B is of the four wheel drive type, the bearing 52 is mounted to one side of the enlargement on the axle housing which contains the differential drive for the four wheels of the vehicle B.

The operator of the pushing vehicle B by using the conventional steering wheel W thereon not only controls the position of the wheels 58 and 59 on the pushing vehicle, but also controls in a like manner the position of the wheels 12 and 13 on which are mounted the pushed vehicle A. In other words, the wheels 12, 13, 58 and 59 turn in unison through the steering wheel W on the pushing vehicle B at the will of the operator thereof.

What is claimed is:

1. A combined steering assembly connection between the front end of a propelling vehicle and the wheels of a wheeled implement each having stub axles with arms theeron, a tie rod connecting the arms of the stub axles of the propelling vehicle, a lever connected to the tie rod, a rotatable rod supported in a bearing on the axle of the propelling vehicle, said rotating rod at one end being rigidly connected to a short lever which is loosely connected to the lever attached to the tie rod, the other end of the rotatable rod beyond its bearing having a key therein to engage a spline formed in the hollow end of a section of a universal coupling, the other end of the universal coupling being in the form of a rod supported in a bearing on the chassis of the wheeled implement, the end of the last rotatable rod section of the universal coupling having rigidly secured thereto an arm and a connection between said arm and the arm of one stub axle of the wheeled implement and a tie rod connecting said arm of said stub axle to the other arm of the stub axle of the wheeled implement.

2. A combined steering assembly connected between the front end of a propelling vehicle and the rear end of a wheeled implement comprising pivoted stub axles on each of the steered front wheels of the vehicle and the implement wheels, arms carried by each of the stub axles on the vehicle and the implement, a tie rod connecting the arms of the stub axles on the propelling vehicle, a bracket on said tie rod to which is attached a lever, a bearing on the front axle of the propelling vehicle, a rod rotating in said bearing and rigidly connected to an arm, said arm being loosely connected to the lever attached to the tie rod, said rotatable rod projecting through said bearing and engaging a section of a universal coupling between the two vehicles, the other end of the universal coupling being supported in and carried by a bearing mounted on the chassis of the wheeled implement and a fixed connection between the last mentioned end of the universal coupling and one arm of a stub axle of the implement, said arm of the stub axle being connected by a tie rod to the end of the other stub axle of the wheeled implement.

3. A combined steering assembly connecting the front wheels of a propelling vehicle and the wheels of a wheeled implement each having stub axles with arms thereon, a rod supported in a bearing on the chassis of the wheeled implement, said rod having rigidly attached at one end a lever for controlling the position of an arm loosely attached to the arm of a stub axle of the wheeled implement, the other end of the rotatable rod forming a member of a universal connection, the other end of the universal connection being in the form of a tube having a spline on its inner wall, a rod mounted for rotation in a bearing positioned on the front axle of the propelling vehicle, one end of the rod having a key therein which enters the spline of the tube section of the universal coupling, a tie rod between the stub axles of the impelling vehicle, said tie rod having a bracket thereon to support a lever attached thereto and a short lever rigidly connected to the rotatable rod in the bearing on the front axle of the propelling vehicle, said lever being loosely connected to the lever attached to the tie rod of the same vehicle.

MICHAEL M. PILTZ.

REFERENCES CITED

The following references are of record in the file of this patent:

UNITED STATES PATENTS

| Number | Name | Date |
|---|---|---|
| 739,675 | Houghton | Sept. 22, 1903 |
| 1,114,586 | Cuddy | Oct. 20, 1914 |